United States Patent [19]

Inada et al.

[11] 4,076,172
[45] Feb. 28, 1978

[54] TEMPERATURE RESPONSIVE VALVE ASSEMBLY

[75] Inventors: Masami Inada, Toyoake; Kazuhiko Kitamura, Toyota, both of Japan

[73] Assignee: Aisin Seiki Kabushiki Kaisha, Kariya, Japan

[21] Appl. No.: 751,720

[22] Filed: Dec. 17, 1976

[30] Foreign Application Priority Data

Jan. 12, 1976 Japan .................. 51-003069

[51] Int. Cl.² ............................................. G05D 23/10
[52] U.S. Cl. ......................... 236/48 R; 123/117 A; 137/625.34; 236/87; 251/11
[58] Field of Search ......... 137/625.18, 625.34; 251/11; 236/48 R, 87, 101 C; 123/117 A

[56] References Cited
U.S. PATENT DOCUMENTS

| 3,229,956 | 1/1966 | White ......................... 251/11 |
| 3,383,041 | 5/1968 | Stratynski .................. 236/87 X |
| 3,542,289 | 11/1970 | Ojala et al. .............. 236/48 R |
| 3,858,611 | 1/1975 | Thayer ..................... 251/11 X |
| 3,902,663 | 9/1975 | Elmer ........................ 236/87 |
| 3,930,515 | 1/1976 | Kennedy et al. ....... 123/117 A X |

Primary Examiner—William E. Wayner
Assistant Examiner—William E. Tapolcai, Jr.
Attorney, Agent, or Firm—Oblon, Fisher, Spivak, McClelland & Maier

[57] ABSTRACT

A temperature responsive valve assembly including a body having an inlet port and first and second outlet ports, a thermostatic bimetal disk disposed within the body and responsive to a variation in temperature to change the curvature thereof from a first position to a second position, a valve spool following the movement of the bimetal disk and having first and second valve portions, an adjusting member secured to the valve spool at a proper position and arranged to be engageable with the bimetal disk, a first seat member disposed within a first passage between the inlet port and the first outlet port, the first seat member engageable with the first valve portion of the valve spool to thereby control the first passage, and a second seat member disposed within a second passage between the inlet port and the second outlet port, the second seat member engageable with the second valve portion of the valve spool to thereby control the second passage, and the second seat member being adjustably threaded with the body.

3 Claims, 3 Drawing Figures

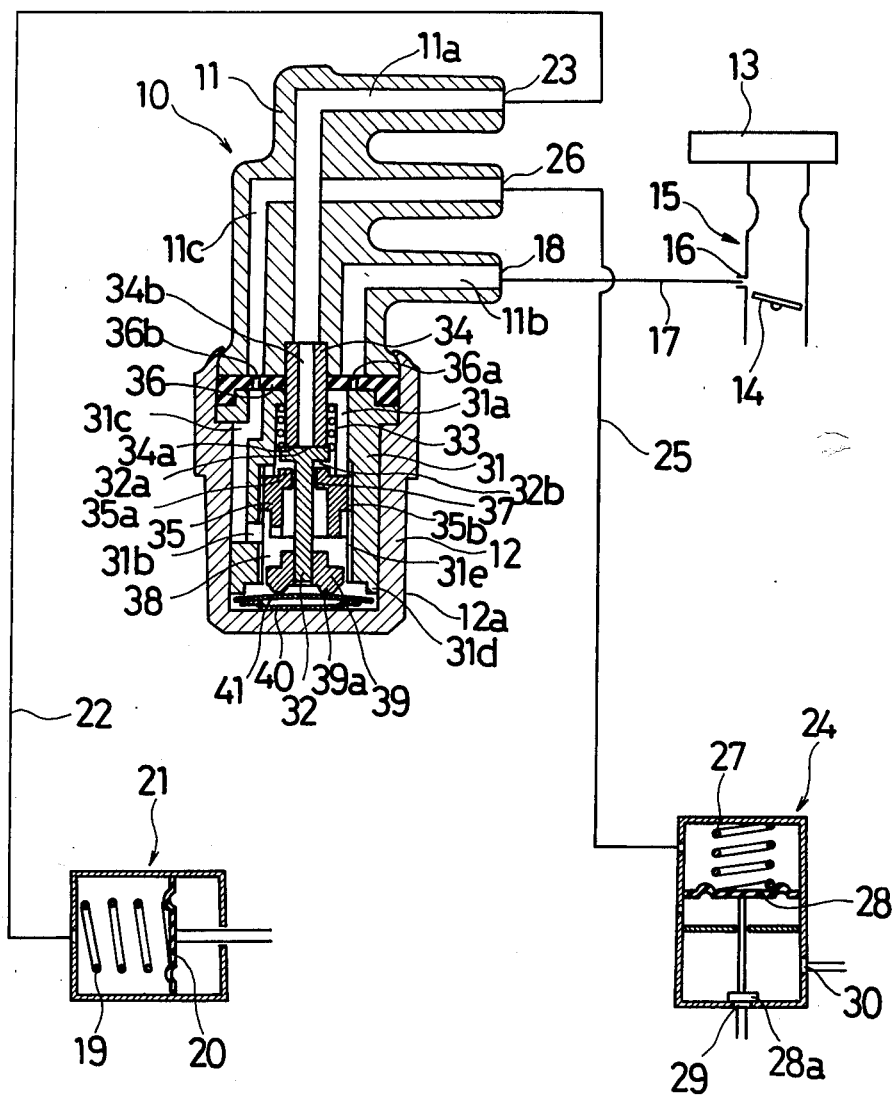

TEMPERATURE RESPONSIVE VALVE ASSEMBLY

BACKGROUND OF THE INVENTION

1. Field of the Invention

This invention relates to a temperature responsive valve assembly and more particularly to a temperature responsive valve assembly which selectively blocks outlet ports to prevent fluid flow from an inlet port to one of the outlet ports while permitting flow to the other outlet port.

2. Description of the Prior Art

Conventionally, various temperature responsive valve assemblies have been proposed in which are included a circular dish-shaped thermostatic bimetal disk movable in response to a variation in temperature to thereby connect an inlet port with a selected one of outlet ports. The valve assemblies of the above type are disclosed, for example, in U.S. Pat. Nos. 3,595,262 and 3,704,697. More particularly, the bimetal disk will snap in response to a variation in temperature from a first position wherein one outlet port is blocked from the inlet port to a second position wherein the other outlet port is blocked from the inlet port. This means that either of two outlet ports has to be effectively blocked by the bimetal disk which ever position the bimetal disk occupies. This requires a precise snap range of the bimetal disk to selectively block outlet ports. It has been quite difficult to completely satisfy the above requirement and therefore the blocking or sealing has been decreased.

Furthermore, it is well known that the bimetal disk will suddenly snap during small variations in temperature. In other words, the bimetal disk will gradually change its curvature from a first position in which the bimetal disk blocks one outlet port towards a second position in which the bimetal disk blocks the other outlet port, when the bimetal disk senses a predetermined temperature. Thereafter, the bimetal disk will suddenly snap towards its second position and will reverse its curvature, during a further small variation in temperature. Finally, the bimetal disk will gradually change its reversed curvature in accordance with a further increase in temperature. The above variation in temperature when the bimetal disk will suddenly snap is considerably small in comparison with the above variations in temperature when the bimetal disk will gradually change its curvature. Accordingly, it is desirable that the change-over valving function of the bimetal disk is completed during the above small variation in temperature in order to satisfy a good response of valving function. However, the above difficulty of the precise snap range will also adversely effect the good response of the valving portion.

SUMMARY OF THE INVENTION

It is, therefore, an object of the present invention to provide an improved temperature responsive valve assembly which obviates the various drawbacks mentioned above.

It is another object of the present invention to provide an improved temperature responsive valve assembly wherein a snap range of a circular thermostatic bimetal disk can be adjustable.

It is still another object of the present invention to provide an improved temperature responsive valve assembly which increases a blocking or sealing effect.

It is a further object of the present invention to provide an improved temperature responsive valve assembly which has a good response in valving function.

BRIEF DESCRIPTION OF THE DRAWING

Various other objects, features and attendant advantages of the present invention will be more fully appreciated as the same becomes better understood from the following detailed description when considered in connection with the accompanying drawing wherein:

the single drawing is a cross sectional view of the temperature responsive valve assembly according to the present invention to be applied within, for example, an emission control system for vehicles.

DETAILED DESCRIPTION OF THE INVENTION

Referring now to the drawing, a temperature responsive valve assembly 10 includes first and second bodies 11 and 12 sealingly secured to each other. The first body 11 has an inlet port 18 which is in communication with an advance port 16 of a conventional carburetor 15 via a conduit 17. The carburetor 15 has an air filter 13 and a throttle valve 14 so that a vacuum pressure is produced at the advance port 16 in response to the opening degree of the throttle valve 14 which mechanically connects with an accelerator pedal, not shown.

The first body 11 also has a first outlet port 23 which operatively connects, via a conduit 22, with a servo means 21 having a diaphragm piston 20 with a spring 19. The servo means 21 is operatively connected with an adjustable plate of a distributor, not shown, for controlling the engine spark timing. The first body 11 further has a second outlet 26 which operatively connects with a control valve means 24 for an exhaust gas recirculating system through a conduit 25. The control valve means 24 includes a diaphragm piston 28 biased by a spring 27, the piston 28 having a valve portion 28a which adapts to control a port 29. The drawing illustrates the valve portion 28a which closes the port 29 for receiving a portion of exhaust gas from a port 30 leading to an intake manifold. The second body 12 includes at the periphery thereof threads 12a through which the second body 12 is threaded with a water jacket, not shown, for cooling the vehicle engine.

The second body 12 may be formed of a thermally conductive material such as steel adapted for heat-exchange with the engine so that the variation in temperature of engine cooling water can be transferred to a bimetal disk, as will be clear hereinafter.

A cylindrical member 31 is sealingly fitted within the second body 12. A valve spool 32 is slidably disposed within the cylindrical member 31 and is always biased by means of a spring 33 one end of which engages with an inner surface of the cylindrical member 31. A first valve seat member 34 is secured to the first body 11 and the cylindrical member 31, and has a seat 34a which is adapted to be engageable with a first valve portion 32a of the valve spool 32. When the valve spool 32 is in its illustrated position, the first valve portion 32a engages with the seat 34a so that the first outlet port 23, namely passages 11a and 34b formed in the first body 11 and the first seat member 34, respectively, are closed from the inlet port 18. Accordingly, no vacuum pressure is transmitted to the servo means 21.

The valve spool 32 extends through a second valve seat member 35 which is threaded with the cylindrical member 31, and a second valve portion 32b of the valve spool 32 is arranged to be engageable with a seat 35a of the second seat member 35. In the illustrated position of the valve spool 32, the second valve portion 32b is spaced from the seat 35a so that a passsage 31a, provided in the cylindrical member 31, is in communication with a chamber 38 through a passage 37 between the valve spool 32 and the second seat member 35. The passage 31a always communicates with the inlet port 18 through a hole 36a provided in a seal member 36 and a passage 11b provided in the first body 11, while the chamber 38 always communicates with the second outlet port 26 through passages 31b and 31c provided in the cylindrical member 31, a hole 36b provided in the seal member 36 and a passage 11c provided in the first body 11. When the valve spool 32 is displaced downwardly as will be clear hereinafter, the second valve portion 32b engages with the seat 35a to thereby block the fluid communication between the inlet port 18 and the second outlet port 26 while permitting fluid communication between the inlet port 18 and the first outlet port 23 by means of the disengagement of the first valve portion 32a from the seat 34a.

An adjusting member 39 is secured to the lower portion of the valve spool 32, and a lower end 39a engages with a circular dish-shaped thermostatic bimetal disk 41 which is biased by means of a spring member 40 towards the adjusting member 39. The adjusting member 39 may be threaded with the valve spool 32 by screw means. The bimetal disk 41 is arranged to be snapped responsive to variations in temperature of engine cooling water through the second body 12, as will be apparent hereinbefore. More particularly, the bimetal disk 41 will snap responsive to variations in the temperature from its first position in which the bimetal disk 41 is of a convex configuration towards the adjusting member 39 to its second position in which the bimetal disk 41 is of the convex configuration towards the bottom of the second body 12. The above snapping or reverse movement of the bimetal disk 41 may be guided by means of the inner wall of the second body 12 and the adjusting member 39. When the bimetal disk 41 is in its second position, the outer periphery of the disk 41 may engage with a lower end 31d of the cylindrical member 31 so that the bimetal disk 41 reacts against the lower end 31d to effect the snapping movement thereof into its first position. The valve spool 32 follows the movement of the bimetal disk 41 through the adjusting member 39 to selectively connect the inlet port 18 to either of the outlet ports 23 and 26.

It should be noted that in order to selectively and effectively control the above two valving portions, the stroke of the valve spool 32 has to be set in accordance with the snapping range of the bimetal disk 41. For the above purpose, the cylindrical member 31 has at its inner periphery threads 31e which engage with threads 35b provided on the outer periphery of the second valve seat 35. Thus, the second valve seat 35 is positioned through means of screwing of the above threads such that the second valve portion 32b of the valve spool 32 effectively engages with the seat 35a of the second seat member 35 when the bimetal disk 41 snaps from the first position into the second position. Thereafter, the adjusting member 39 is secured to or threaded with the valve spool 32 such that the first valve portion 32a effectively engages with the seat 34a of the first seat member 34 when the bimetal disk 41 snaps from the second position into the first position. Therefore, the stroke of the valve spool 32 is designed responsive to the snapping range of the bimetal disk 41 to thereby satisfy the selective valving function of two valving portions.

Furthermore, it is well known in the art that the bimetal disk 41 completes its snapping movement according to the following three stages: In the first stage, the bimetal disk 41 gradually changes its curvature when the disk 41 senses a predetermined temperature. In the second stage, the bimetal disk 41 suddenly reverses its curvature upon the further increase in temperature, but during small variation in temperature. In the third stage, the bimetal disk 41 gradually changes its reversed curvature upon the still further increase in temperature. Variation in temperature during movement of the bimetal disk 41 in the second stage is quite small in comparison with variation in temperature during movement of the bimetal disk 41 in the first or third stage. It is desirable, therefore, that the change-over functionn of two valving portions is completed by reverse movement of the bimetal disk 41 thereby effecting a good response of valving function. It will be apparent that this requirement may be satisfied by means of proper adjusting of stroke of the valve spool 32 mentioned above.

It will be obvious that the cylindrical member 31 may be formed integrally with the second body 12.

The operation of the emission control system having the temperature responsive valve assembly 10 will be described hereinafter.

When the temperature of engine cooling water is higher than the predetermined temperture, the bimetal disk 41 will be in its first or illustrated position.

Therefore, the valve spool 32 is in its illustrated position wherein the first valve portion 32a engages with the seat 34a to block fluid communication between the inlet port 18 and the first outlet port 23, while the second valve portion 32b is spaced from the seat 35a to establish fluid communication between the inlet port 18 and the second outlet port 26. Accordingly, vacuum produced at the advance port 16 of the carburetor 15 responsive to the opening degree of the throttle valve 14 is transmitted to the second outlet port 26 and then to the control valve means 24 for the exhaust gas recirculation system. When the vacuum transmitted to the control valve means 34 exceeds a predetermined pressure, the diaphragm piston 28 is displaced against the biasing force of the spring 27 so that the valve portion 28a is moved so as to establish communication between the ports 29 and 30. Thus a portion of exhaust gas within the exhaust manifold can be transmitted to the intake manifold so as to particularly reduce the nitrogen oxide content of the exhaust gas.

When the temperature of engine cooling water is less than predetermined temperature, the bimetal disk 41 will snap from its first position into its second position wherein the bimetal disk 41 is of convex configuration towards the bottom of the second body 12. Accordingly, the first valve portion 32a is disengaged from the seat 34a while the second valve portion 32b engages with the seat 35a. This means that the inlet port 18 is blocked from the second outlet port 26, but communicates with the first outlet port 23. Now, vacuum at the inlet port 18 can be transmitted to the servo means 21 for controlling the engine spark timing. When the vacuum transmitted to the servo means 21 increases to a predetermined value, the diaphragm piston 20 is moved against the biasing force of the spring 19 to thereby advance the engine spark timing.

The detailed explanation of the exhaust gas recirculation system is disclosed in, for example, U.S. Pat. No. 3,641,989, and the detailed explanation of the engine spark timing control system is disclosed in, for example, U.S. Pat. No. 3,606,871. Therefore, the detailed explanation of the emission control system will be omitted.

It is obvious that the temperature responsive valve assembly according to the present invention may be applied to other systems, for instance, the conventional air injection system.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A temperature responsive valve assembly comprising:
    a body havng an inlet port and first and second outlet ports,
    a thermostatic bimetal disk disposed within said body and responsive to a variation in temperature to change the curvature thereof from a first position to a second position,
    a valve spool following the movement of said bimetal disk and having first and second valve portions,
    an adjusting member secured to said valve spool at a proper position and arranged to be engageable with said bimetal disk,
    a first seat member disposed within a first passage between said inlet port and said first outlet port, said first seat member engageable with said first valve portion of said valve spool to thereby control said first passage, and
    a second seat member disposed within a second passage between said inlet port and said second outlet port, said second seat member engageable with said second valve portion of said valve spool to thereby control said second passage, and said second seat member being adjustably threaded with said body.

2. A temperature responsive valve assembly as set forth in claim 1, wherein:
    said body has a cylindrical member which is secured thereto, said cylindrical member having inner periphery threads which engage with threads provided on the outer periphery of said second seat member.

3. A temperature responsive valve assembly as set forth in claim 1 further comprising:
    a spring means biasing said bimetal disk towards said first position.

* * * * *